May 22, 1956 O. MAZZEI 2,746,115
COUPLING DEVICE
Filed Aug. 27, 1952
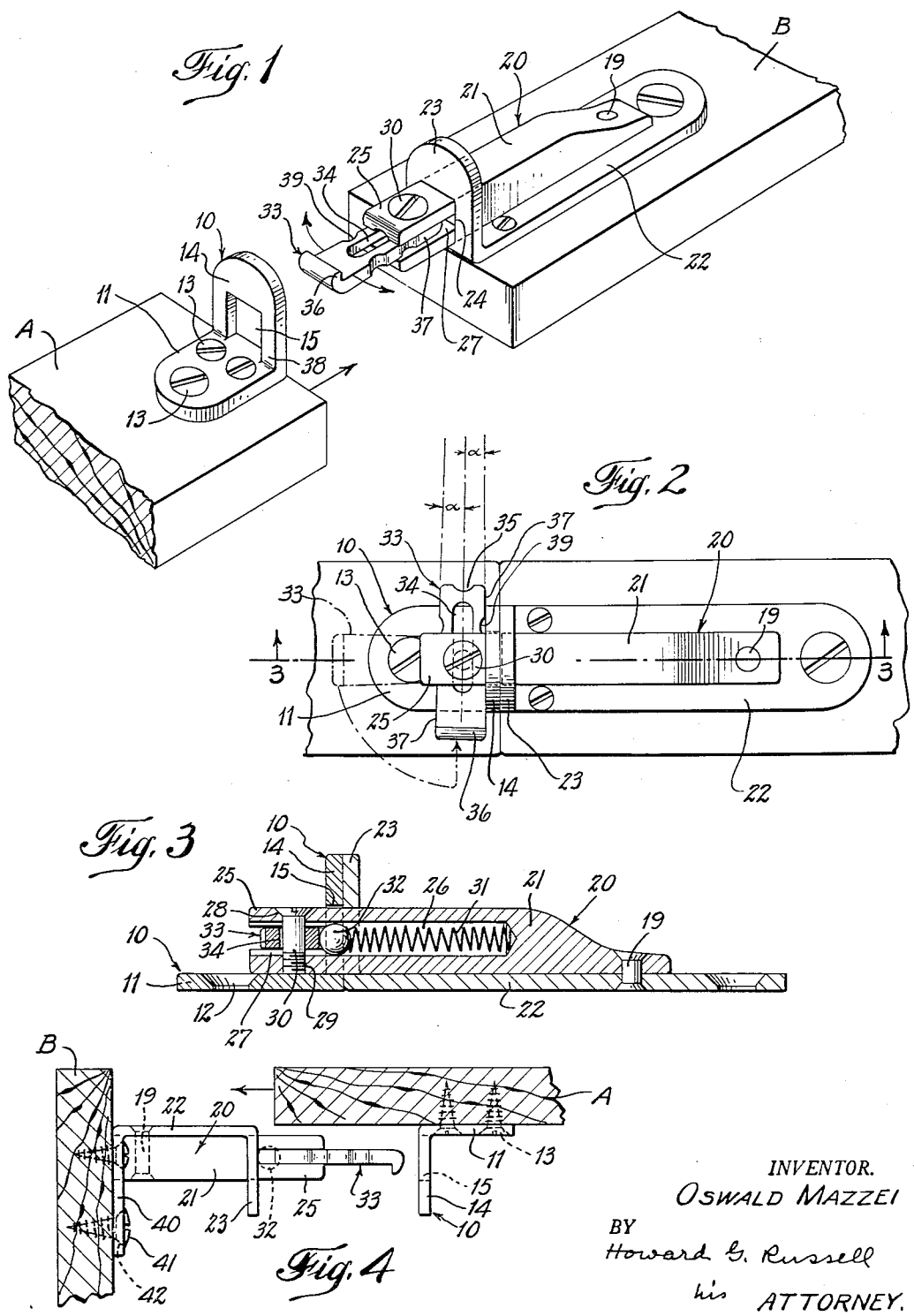
INVENTOR.
OSWALD MAZZEI
BY
Howard G. Russell
his ATTORNEY.

United States Patent Office 2,746,115
Patented May 22, 1956

2,746,115

COUPLING DEVICE

Oswald Mazzei, New York, N. Y.

Application August 27, 1952, Serial No. 306,663

3 Claims. (Cl. 24—230)

This invention provides an improved disengageable coupling device for securely and rigidly connecting and holding together the ends of adjacent parts in firm abutting engagement.

This coupling device is particularly useful where it is desirable and sometimes necessary, as in military operations, rapidly to assemble or disassemble a structure made up of components such as overline and pontoon bridges, large temporary huts and housing, erecting and construction frames, airfield landing strip sections, partitions and the like.

The purpose of this invention is to provide a coupling device which is simple in construction, cheap to manufacture, positive in operation and affords savings in labor and time when used in conjunction with objects to be releasably joined by eliminating threading, adjusting, fitting, screwing and cutting operations.

The various objects, features, and advantages of this invention will appear more fully from the detailed description which follows accompanied by drawings showing, for the purpose of illustration, a preferred embodiment of the invention. The invention also consists in certain new and original features of construction and combination of elements hereinafter set forth and claimed.

Although the characteristic features of this invention which are believed to be novel will be particularly pointed out in the claims appended hereto, the invention itself, its objects and advantages, and the manner in which it may be carried out may be better understood by referring to the following description taken in connection with the accompanying drawings forming a part of it in which:

Fig. 1 is a perspective view of the coupling device in a disengaged position secured to two objects to be coupled in end to end abutting engagement.

Fig. 2 is a top plan view of the coupling device showing the two objects joined in end to end locked abutting engagement.

Fig. 3 is a longitudinal cross sectional view of the coupling device, the section being taken on line 3—3 of Fig. 2.

Fig. 4 is a side elevational view of a modified coupling device, in disengaged position, for connecting two objects at right angles to each other.

In Figs. 1, 2, and 4, A and B represent portions of objects to be disengageably connected.

The coupling device comprises a locking plate 10 having a base portion 11 with holes 12 for securing the locking plate to the object by bolts, rivets, or screws as indicated at 13. The locking plate 10 has an upstanding flange 14 having an aperture 15 therein.

The bolt element 20 comprises a rectangular bar or bolt 21 fastened to a base plate 22 by a rivet 19. The base plate 22 is provided with an upturned right angle flange 23 having an opening 24 through which one end 25 of the bar 21 projects. A cylindrical recess 26 extends far into the body of the bar 21 from the end 25. The end 25 is further slotted at 27 and a pair of holes 28 and 29 extend through the slotted portion. The hole 29 is tapped to receive a pivot pin 30 having a threaded end. A spring 31 and ball 32 are contained within the cylindrical recess 26 and constitute a resilient detent. A cotter 33 having an elongated internal slot 34, and an upturned lip 36 is retained in the slot 27 by the pivot pin 30 with freedom to turn about and slide relatively to said pivot pin 30. The cotter 33 is small enough to fit the through the aperture 15 when the cotter is aligned with the bolt element 20. The slot preferably extends at a slight angle α with respect to the side surfaces 37 of the cotter, as shown in Fig. 2.

Referring to Fig. 1, it will be readily seen that the cotter 33 fits through the aperture 15 of the locking plate 10 when the cotter 33 is aligned with the bolt element 20. In this position, the cotter 33 and bar end 25 slide through the aperture 15 until the upstanding flange 14 and the right angle flange 23 come close together. In order to lock objects A and B in abutting engagement by the coupling device, the cotter 33 is turned sideways approximately 90 degrees and moved at right angles to said upstanding flange 14, as illustrated in Fig. 2. If the side surfaces 37 of the cotter extend at an angle with respect to the slot, lengthwise movement of the cotter draws the objects A and B together by wedge action.

In order to keep the cotter aligned with the bolt element 20 prior to sliding the end 25 through the aperture 15, the cotter 33 is provided with a notch 35 into which the ball 32 is forced by the action of spring 31 when the cotter 33 is aligned with the bolt element 20. The cotter 33 may have further detent notches 39 in its side surfaces 37 to prevent loosening of the cotter under vibration.

In order to disengage the objects A and B the cotter 33 is pulled along the flange 14 at points 38 until the end of the slot strikes the pivot screw 30 and is then turned into line with the bolt element 20. The lip 36 facilitates handling of the cotter and may conveniently be engaged by a screw driver in the event the cotter 33 does not move readily.

Fig. 4 illustrates a modified form of the coupling device for disengageably connecting two objects at right angles. The modification essentially consists in a changed form of the base plate which in the form of the device illustrated in Fig. 4 has a securing flange 40 substantially parallel to the front flange 14. Screws 41 extend through holes 42 in the securing flange into the object B.

While certain novel features of this invention have been disclosed herein, it will be understood that various changes may be made without departing from the spirit of this invention.

What is claimed is:

1. A disengageable coupling device for securely and rigidly connecting and holding the ends of adjacent parts in firm abutting engagement, the device comprising, a first mounting plate designed to be fastened to one of two parts to be connected, said mounting plate having an upright flange at one end thereof, the flange having a square hole therethrough; a bolt of substantially square cross-section, said bolt having a slotted end, and being mounted on said plate with its slotted end protruding through and from said hole, the slot being substantially parallel to the mounting plate; a locking plate designed to be fastened to the other of two parts to be connected, said locking plate having an upstanding flange and a square aperture in its flange for receiving said bolt; a cotter having an elongated internal slot in the cotter body; a pivot in said slotted end of the bolt element, said pivot extending through said internal slot, thereby retaining said cotter on said bolt element with freedom to turn about, and slide relatively to, said pivot, said cotter being of small enough cross section to fit through the aperture in the locking plate when the cotter is substantially aligned with said bolt element, said cotter having a side surface abutting the back surface of the flange on the locking plate when said cotter is pivoted 90 degrees with respect to said bolt element, said pivot being so located as to cause snug engagement between the back surface of the flange and said side surface of the cotter in the position in which both flanges abut.

2. A disengageable coupling device for securely and rigidly connecting and holding the ends of adjacent parts in firm abutting engagement, the device comprising, a first mounting plate having an upright flange at one end thereof, the flange having a square hole therethrough; a square bolt mounted on said plate, said bolt having a slotted end extending through said hole; a second mounting plate having an upright flange at one end thereof, said last named flange also having a hole therethrough for engagement by said bolt; a cotter having an elongated internal slot in the cotter body, said cotter being in the slotted end of said bolt; a pivot in said slotted end of the bolt, said pivot extending through said internal slot, thereby retaining said cotter on said bolt with freedom to turn about, and slide relatively to, said pivot, said cotter being of small enough cross section to fit through the hole in the flange of said second mounting plate when the cotter is substantially aligned with said bolt, said cotter having a side surface extending at an angle with respect to said internal slot for abutting the flange of said second mounting plate when the cotter is pivoted 90 degrees with respect to said bolt in the position in which said bolt extends through the flange of said second mounting plate for drawing the two flanges together by wedge action when the cotter is slidably moved at right angles to said bolt in the position in which said flanges abut.

3. A disengageable coupling device for securely and rigidly connecting and holding the ends of adjacent parts in firm abutting engagement, the device comprising, a first mounting plate having an upright flange at one end thereof, said flange having a square hole therethrough; a square bolt mounted on said plate, said bolt having a slotted end extending through said hole; a second mounting plate having an upright flange at one end thereof, said last named flange also having a square hole therethrough for engagement by said bolt; a cotter having an elongated internal slot in the cotter body, said cotter being in the slotted end of said bolt; a pivot in said slotted end of the bolt, said pivot extending through said internal slot, thereby retaining said cotter on said bolt with freedom to turn about, and slide relatively to, said pivot, said cotter being of small enough cross section to fit through the hole in the flange of said second mounting plate when the cotter is substantially aligned with said bolt, said cotter having a side surface abutting the flange of said second mounting plate when said cotter is pivoted 90 degrees with respect to said bolt in the position in which said bolt extends through the flange of said second mounting plate, said cotter having detent notches in its end and in its side surface; and a resilient detent in said bolt, said detent extending into the slotted end of said bolt for engaging said detent notches.

References Cited in the file of this patent

UNITED STATES PATENTS

| | | |
|---|---|---|
| 325,221 | Wright | Aug. 25, 1885 |
| 325,347 | Ladd | Sept. 1, 1885 |
| 584,657 | Worley | June 15, 1897 |
| 2,124,658 | Smith | July 26, 1938 |
| 2,360,395 | Byron | Oct. 17, 1944 |

FOREIGN PATENTS

| | | |
|---|---|---|
| 51,046 | Netherlands | Sept. 15, 1941 |
| 126,329 | Australia | Dec. 16, 1947 |